(12) United States Patent
Boehl et al.

(10) Patent No.: US 8,910,181 B2
(45) Date of Patent: Dec. 9, 2014

(54) DIVIDED CENTRAL DATA PROCESSING

(75) Inventors: Eberhard Boehl, Reutlingen (DE);
Ruben Bartholomae, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 255 days.

(21) Appl. No.: 13/637,843

(22) PCT Filed: Mar. 17, 2011

(86) PCT No.: PCT/EP2011/054019
§ 371 (c)(1),
(2), (4) Date: Dec. 26, 2012

(87) PCT Pub. No.: WO2011/120814
PCT Pub. Date: Oct. 6, 2011

(65) Prior Publication Data
US 2013/0104141 A1    Apr. 25, 2013

(30) Foreign Application Priority Data

Mar. 31, 2010   (DE) .......................... 10 2010 003 512

(51) Int. Cl.
*G06F 9/48*  (2006.01)
*G06F 9/50*  (2006.01)
*G06F 9/38*  (2006.01)

(52) U.S. Cl.
CPC ............ *G06F 9/5083* (2013.01); *G06F 9/4881* (2013.01)
USPC ........... 718/107; 718/100; 718/102; 718/104; 712/208; 712/220

(58) Field of Classification Search
None
See application file for complete search history.

(56) References Cited

U.S. PATENT DOCUMENTS

2003/0046517 A1    3/2003  Lauterbach
2013/0081041 A1*   3/2013  Boehl et al. .................. 718/103

FOREIGN PATENT DOCUMENTS

EP    0 947 926    10/1999

OTHER PUBLICATIONS

Translation of International Preliminary Report on Patentability, PCT International Application No. PCT/EP2011/054019, Oct. 2, 2012.*
International Search Report, PCT International Application No. PCT/EP2011/054019, dated Jul. 7, 2011.
Tanenbaum, A.S, "Modern Operating Systems: Processes and Threads," *Modern Operating Systems*, pp. 71-73, 81, pp. 146-147 (2001).

* cited by examiner

*Primary Examiner* — Qiang Wu
(74) *Attorney, Agent, or Firm* — Kenyon & Kenyon LLP

(57) ABSTRACT

A circuit configuration for a data processing system and a corresponding method for executing multiple tasks by way of a central processing unit having a processing capacity assigned to the processing unit, the circuit configuration being configured to distribute the processing capacity of the processing unit uniformly among the respective tasks, and to process the respective tasks in time-offset fashion until they are respectively executed.

6 Claims, 2 Drawing Sheets

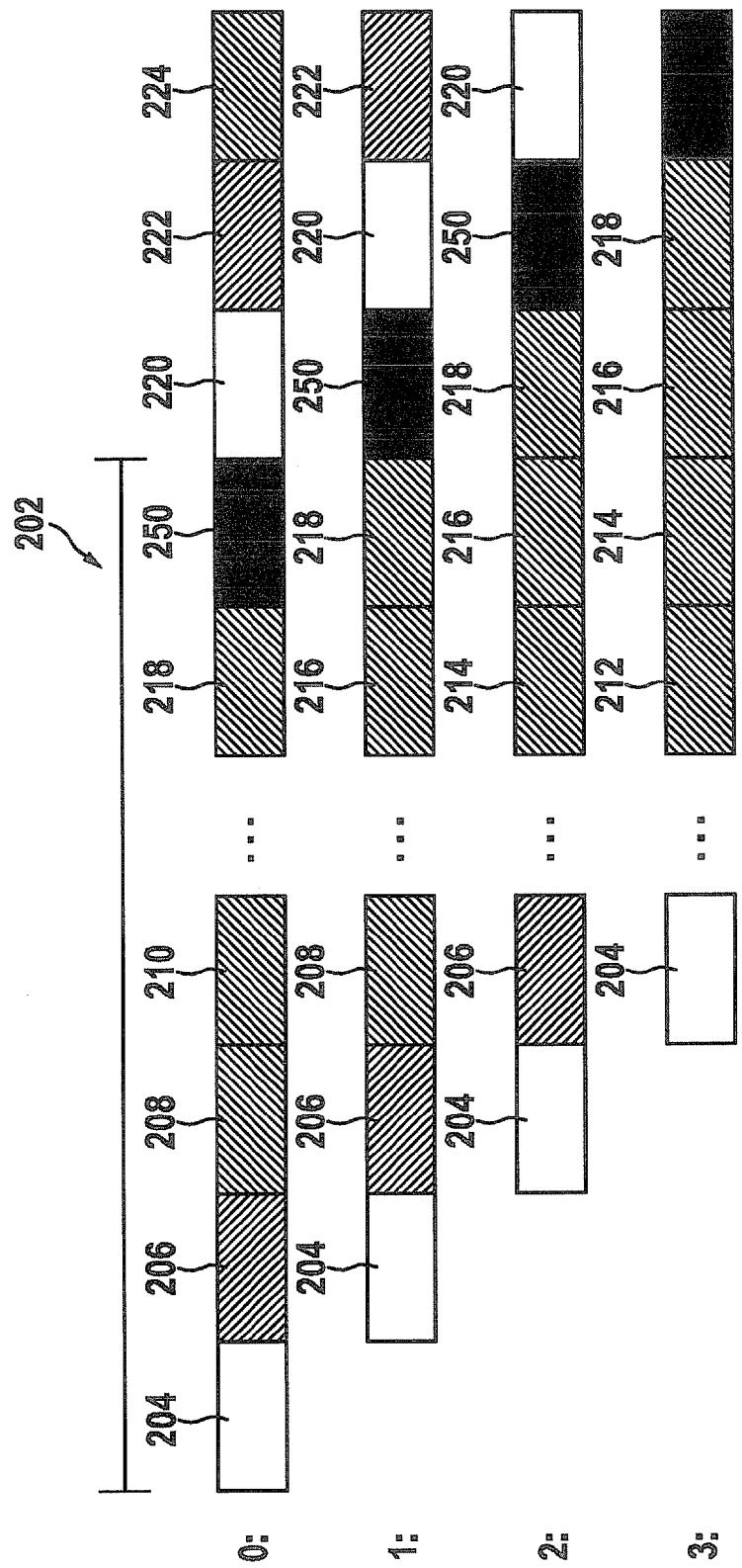

DIVIDED CENTRAL DATA PROCESSING

FIELD OF THE INVENTION

The present invention relates to a circuit configuration for a data processing system for executing a plurality of tasks by way of a central processing unit, and to a corresponding method for executing a plurality of tasks in a data-processing system.

BACKGROUND INFORMATION

In data-processing systems, for example in computer and microprocessor systems, control units, or peripheral units as well as other information-processing systems, so-called central processing units (CPUs) of a computer, or also merely simple arithmetic logic units (ALUs), are often used for the purpose of calculation and data processing. Corresponding memories such as RAM, ROM, EPROM, EEPROM, etc. are also used to store programs and data. The processor or CPU executes or carries out a program, which as a rule can be made up of various sub-programs that in turn can be dedicated to different tasks (multitasking).

The task that is to be executed by the CPU is decided on ad hoc based on a current scenario, i.e., which tasks are requesting execution at that point in time. It is possible in this context for different tasks to be given different priorities, so that upon execution of the tasks, the respective priority assigned to the tasks is complied with and the highest-priority task is correspondingly processed on a priority basis. This occurs, for example, by way of a so-called interrupt, which corresponds to a brief interruption in a program in order to carry out another higher-priority or time-critical processing operation of another task. In this context, firstly an interrupt request is made, after which an interrupt routine is implemented and the previously processed task is interrupted, and after termination of the interrupt, that task is continued at the interrupt point. This means that as a rule, a current request of a highest-priority task is processed on a priority basis, and a task already being processed is instead interrupted. The relevant interrupt authorizes the CPU to jump into a relevant program segment.

The aforesaid multitasking can also bring about so-called "time sharing," which appears to serve multiple users simultaneously. In general, "multitasking" refers to a CPU's ability to execute multiple tasks concurrently, the various processes being activated in constant alternation at such short intervals as to create an impression of simultaneity.

Selection of the priorities to be assigned to individual tasks, and the respective execution times of high-priority tasks, can also, however, cause low-priority tasks to be executed infrequently and in some cases not at all. This is the case when aforementioned interrupt queries are arriving almost continuously, so that the execution of a low-priority task cannot be completed. This case forces a respective user to take actions that guarantee a so-called "worst case execution time" (WCET), i.e., a maximum execution time, and thus ensure a minimum CPU execution capacity for each task to be performed. It has been found, however, that such guarantees can be extremely complex, and moreover can limit the performance of the underlying system. In addition, this requires an interrupt controller with a priority controller. An interrupt controller is a functional unit that is responsible for accepting and distributing interrupts.

It would therefore be desirable to provide a capability for utilizing the available execution capacity of a central calculation unit or CPU in such a way as to guarantee, in simple fashion, that each task to be executed, of whatever priority, is executed within a specific time.

SUMMARY

An example circuit configuration is provided, which is implemented in a data-processing architecture, and is configured to correspondingly apportion, to the processing unit (CPU or ALU) available to the system, the tasks that are to be processed. Suitable embodiments of the circuit configuration presented according to the present invention, and of the example method presented according to the present invention, are described below.

In one example embodiment, a circuit configuration for a data-processing system for executing a plurality of tasks by way of a central processing unit having a processing capacity assigned to the processing unit is made available, the circuit configuration exerting control in such a way that the processing capacity of the processing unit is distributed among the respective tasks, uniformly and independently of a demand of the respective tasks, until they are respectively executed, and the processing unit is assigned to the respective tasks for processing in time-offset fashion. The circuit configuration proposed according to the present invention thus distributes the processing or calculation capacity made available by a central processing unit uniformly among all tasks requiring processing. No prioritization of the tasks to be processed is therefore required, and the aforementioned worst case execution time (WCET) is moreover thereby also automatically accurately determined. In addition, the processing unit is allocated to each task independently of a separate request on the part of the task to be processed. This reduces the calculation time for all tasks to be processed to 1/n (for n tasks), although this does not signify a limitation if that calculation time is sufficient for each of the tasks to be processed.

Utilization of the circuit configuration proposed according to the present invention, and execution of the method proposed according to the present invention, moreover make it possible to predict accurately when a processing operation of the respective tasks is complete.

The method and the circuit configuration proposed according to the present invention can be implemented in a so-called multi-channel sequencer (MCS) of a generic timer module (GTM).

The multi-channel sequencer services multiple channels. According to the present invention, provision can be made that the circuit configuration is configured to allocate to each of the tasks to be processed a respective channel having its own registers, and to select the respective registers and correspondingly connect them to the processing unit in accordance with the assignment of the respective task to the processing unit.

Provision is further made, in accordance with a further embodiment of the circuit configuration proposed according to the present invention, for the circuit configuration to be configured to assign the processing unit respectively to each of the tasks for a constant time unit that is identical for all tasks. If a processing operation requires multiple time units, for example when copying data from RAM into a register or vice versa, the processing can then if applicable be subdivided into sub-tasks each with one time unit, the sub-tasks being executed sequentially, but interrupted by the respective other tasks, for one time unit each. This means that in the case in which multiple time units are required for processing of the task, an assignment of the processing unit to the task occurs repeatedly and preferably periodically, with a period corresponding to one processing cycle of the processing unit.

Provision can be made in this context that the time duration corresponds to one timing cycle of a clock cycle of the processing unit, and the timing cycle is determined by the length of the clock cycle and the number of channels or tasks to be performed.

In a further embodiment of the circuit configuration proposed according to the present invention, provision can be made that the circuit configuration is configured to perform an execution of instructions of the respective registers of the respective channels of the tasks in a pipeline having multiple stages, the respective registers being switched over, at the time of execution, into correspondingly clocked pipeline registers of the pipeline, and the pipeline registers being processed in a time segment in parallel but for different channels in each case.

Provision can be made in this context that, for example, an instruction decoding operation and a memory access for a first task occur respectively in time segments in which the processing unit is assigned to a second task. This would correspond to two-stage pipelining, or to a two-stage pipeline architecture.

The present invention furthermore relates to a corresponding method for executing multiple tasks in a data processing system using a central processing unit having a processing capacity assigned to the processing unit. In this context, the processing capacity of the processing unit is distributed among the respective tasks uniformly and independently of a demand of the respective tasks. In the individual time units resulting therefrom, the corresponding tasks are processed in time-offset fashion until they are respectively executed.

It is possible in this case that a respective channel having registers is allocated to each of the tasks, and that the respective registers are selected and correspondingly connected to the processing unit in accordance with the assignment of the respective tasks to the central processing unit.

It is further possible for an execution of instructions of the respective registers of the channels allocated to the respective tasks to be performed in a pipeline having multiple pipeline stages, the respective registers being switched over, at the time of execution, into correspondingly clocked pipeline registers of the pipeline, and the pipeline stages being processed in a time segment in parallel but for different channels in each case.

Further advantages and example embodiments of the present invention are evident from the description and from the figures.

It is understood that the features described above and explained below are usable not only in the particular combination indicated, but also in other combinations or in isolation, without departing from the scope of the present invention.

BRIEF DESCRIPTION OF THE DRAWINGS

FIG. 2 shows an example embodiment of a pipelining system in accordance with which instruction processing operations according to the example method according to the present invention can be performed.

DETAILED DESCRIPTION OF EXAMPLE EMBODIMENTS

Figure 1:
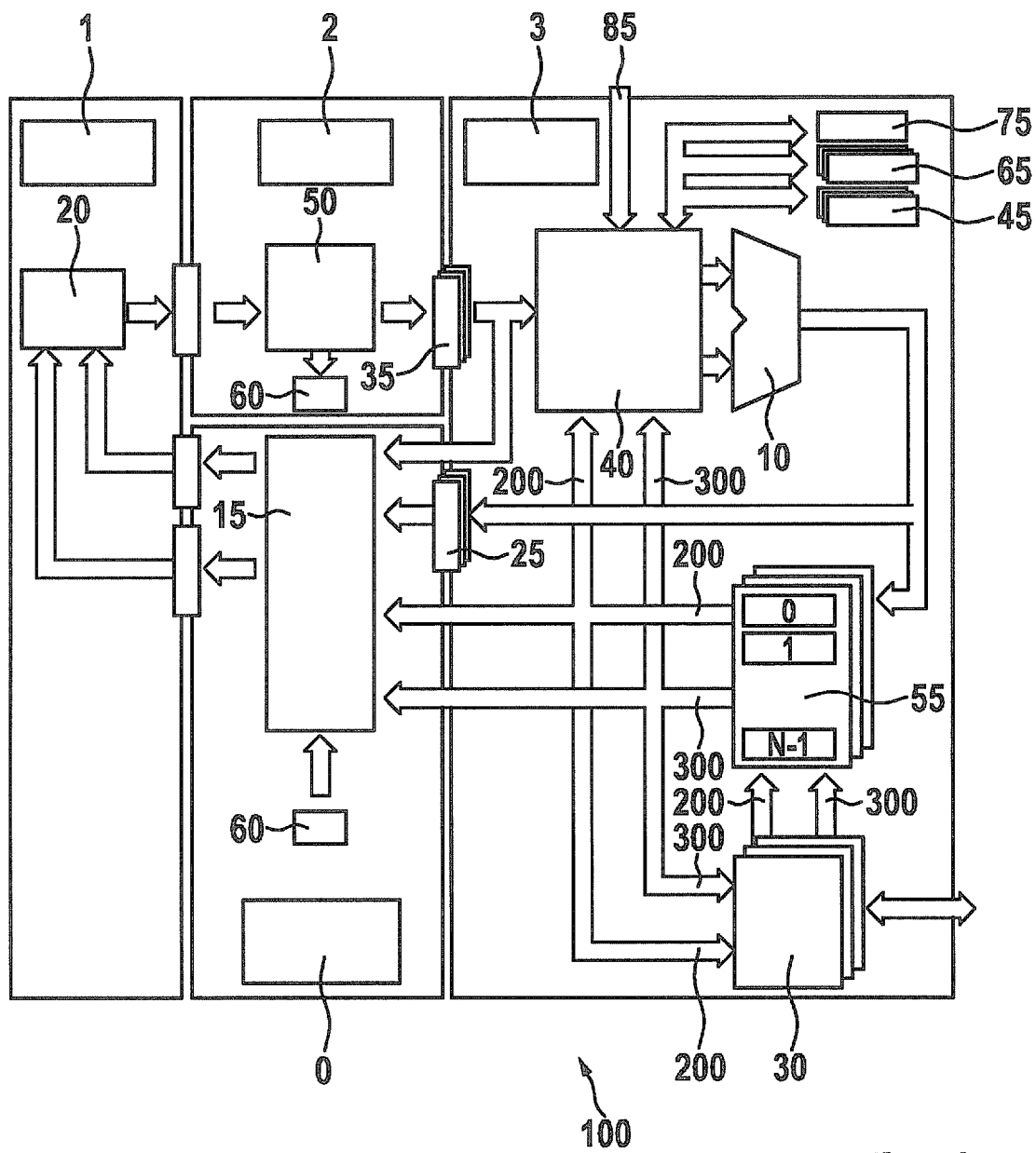
FIG. 1 shows an architecture model in which an example method according to the present invention can be implemented.

The present invention is depicted schematically in the figures on the basis of example embodiments, and is described in detail with reference to the figures, in which a detailed description of structure and function will be given.

FIG. 1 shows an architecture model of a multi-channel sequencer (MCS); the multi-channel sequencer can be part of a so-called generic timer module (GTM). The architecture depicted here is labeled in its entirety with the reference number 100.

The example method according to the present invention can be implemented, for example, in this kind of multi-channel sequencer (MCS) of a generic timer module (TGM). The MCS services multiple channels T, for example eight or 16, corresponding to the tasks to be processed. This means that one channel is allocated to each task to be processed. MCS 100 possesses a central processing unit 10 and a memory (RAM) 20. In the case depicted here, for example, T channels are serviced by the MCS 100, each channel possessing its own microprogram that is housed at different locations in the memory. To execute that program, each channel possesses its own instruction register (IR) 35, its own instruction counter (PC) 25, its own status register (STA) 45, and its own so-called general purpose register (GPR) 55 having respectively N registers that, in the present depiction, are labeled 0 to N−1. This means that in the MCS architecture 100 depicted here, T instruction registers (T*IR) 35, T instruction counters (T*PC) 25, and T status registers (STA) 45 are present, identified in each case by an indicated superimposition of the corresponding symbols. Each channel furthermore possesses its own interface 30 through which data in the respective GPRs 55 can be synchronously updated, i.e., without waiting for processing of a corresponding channel, and data can be outputted. Interface 30 can be, for example, an advanced routing unit interface (ARU interface). The plurality of interfaces 30, corresponding to the number of channels to be processed, is once again depicted in FIG. 1 by an indicated superimposition of the symbols representing the respective interfaces 30. The same applies to the depiction of the respective registers made available separately for each channel. For synchronization purposes, processing of a channel is blocked, meaning that an operation to be carried out, and thus further program execution, occurs only when requested data have arrived or been fetched via the respective ARU interface 30 assigned to the corresponding channel. An ARU interface 30 of a channel is completed in each case by its own control bit register (ACE) 65. Here as well, an indicated superimposition of the corresponding symbol identifies the fact that one control bit register 65 is made available for each of the T channels. These control bits are conveyed, with the data of the GPRs 55, to ARU interface 30, where they are sent out or are updated with each ARU read instruction.

All the channels serviced by MCS 100 use the same arithmetic logic unit (ALU) 10, the same instruction decoder 40, the same instruction predecoder 50, the same RAM 20, and the same address decoder 15 for RAM 20, as depicted in FIG. 1. In the architecture depicted here, an external (host) CPU intervenes in the execution via a host CPU interface 60 via RAM 20, i.e., data are transferred, in a time slot or time unit reserved therefor, from or to handshake interface 60 of the host CPU. The host CPU itself is not located in the MCS.

The execution of instructions can be performed, for example, as depicted in FIG. 2, in a pipeline having a plurality of pipeline stages. A distinction is preferably made among four pipeline stages: stage 0, stage 1, stage 2, stage 3. The pipeline or instruction pipeline refers to a kind of assembly line with which the execution of instructions is broken down into sub-instructions corresponding to the number of pipeline stages, such that the pipeline stages can be carried out in parallel for multiple instructions (i.e., tasks). This means that instead of having a task completely executed during one processing cycle 202 of a processor, only one sub-task is executed in each case, although different sub-tasks of multiple tasks are being processed simultaneously. The pipeline stages can preferably be:

Stage 0 RAM access decoding
Stage 1 RAM access
Stage 2 Instruction pre-decoding
Stage 3 Instruction execution In stage 0, addresses and control signals are first created for the RAM access pending in the next pipeline stage. A RAM access can be the reading of a datum or of an instruction, or the writing of a datum. In the case of reading of an instruction, the address is created from the relevant instruction counter (PC). This pipeline stage is depicted in FIGS. 1 and 2 with the reference character 0 in each case.

In stage 1, access to working memory (RAM) then takes place, the corresponding instruction being loaded from working memory. This pipeline stage is depicted in FIGS. 1 and 2 with the reference character 1 in each case.

In stage 2 an instruction pre-decoding then takes place. This pipeline stage is depicted in FIGS. 1 and 2 with the reference character 2 in each case.

In stage 3, lastly, instruction execution occurs, this being performed for all tasks by one and the same processing unit, namely ALU 10 that is depicted here. This pipeline stage is depicted in FIGS. 1 and 2 with the reference character 3 in each case.

All the pipeline stages 0, 1, 2, 3 are processed in parallel, but in each case for a different channel or a task allocated to the corresponding channel.

FIG. 2 illustrates, on the basis of an example, the execution of MCS programs as characterized over time. In this example, for a selected cyclic processing cycle 202 of T+1 timing cycles, all T MCS channels in each pipeline stage, i.e., stage 0, stage 1, stage 2, stage 3, are active for exactly one timing cycle or other processing time. This provision of a processing time for each of the tasks (channels) occurs irrespective of whether a task is in fact intended to be carried out in the corresponding channel. In addition, a time slot 250 of at least one timing cycle or another processing time (in FIG. 2, exactly one timing cycle) is reserved within a processing cycle of the CPU as well. During this time the CPU has the ability to write data into or read data from RAM 20.

This can be described in detail as follows: If channel $C_0$, here designated 204, for example begins first with decoding of the RAM address, at the next timing cycle channel $C_0$ will execute the RAM access, while channel $C_1$, here designated 206, is busy decoding the RAM address. The corresponding "own" registers T*PC and T*IR, depicted in FIG. 1 with the respective reference characters 25 and 35, are switched in automatically for this depending on the channel. In pipeline stage 3, instructions that require only one processing cycle of execution time process the operands 200 and optionally 300 from the separate registers (GPRs) 55, or the direct operands from the instruction word, and write the result back into the corresponding register. One further processing cycle is needed in order to write the data back into working memory (RAM). This is done by setting, in the respective status register (STA) 45 of the corresponding channel, a bit that causes writing back to occur in the next processing cycle. This means that when the channel is again processed in pipeline stage 0, the corresponding RAM address is decoded and the data are then, in pipeline stage 1, written from the corresponding GPR 55 into RAM 20. The behavior is similar for the processing of operands from RAM 20. An entire pipeline execution is needed in order to load data out of RAM 20 into the corresponding GPR register 55. Not until a subsequent processing cycle can that operand then be processed.

FIG. 2 illustrates the parallel processing of pipeline stages in the case of, for example, T channels. In the case depicted here, the pipeline encompasses four pipeline stages, depicted as stage 0, stage 1, stage 2, and stage 3. One processing cycle 202 corresponds here to T+1 timing cycles. After a startup phase, in each timing cycle exactly one channel is assigned to a pipeline stage and correspondingly processed. The pipeline stages are therefore processed in parallel but for a different channel in each case. As already mentioned, the CPU has at least one additional time slot 250 assigned to it, with the result that processing cycle 202 encompasses T+1 timing cycles. The designation "t" refers hereinafter to a counter for a respective (in this case a first) processing cycle 202.

FIG. 2 shows in detail that in the first pipeline stage (stage 0), during a first processing cycle 202 in which the counter has the value "t", a zero-th channel $C_0$ (t) 204, a first channel $C_1$ (t) 206, a second channel $C_2$ (t) 208, a third channel $C_3$ (t) 210, etc. are executed. The last operation to occur during first processing cycle 202 is execution of a T–1-th channel $C_{T-1}$ (t) 218. Lastly, there still remains a time slot 250 for the CPU or for a channel reserved for the CPU. In a subsequent processing cycle, the value of the counter is incremented by 1 to "t+1". During this subsequent processing cycle, in pipeline stage 0 the zero-th channel $C_0$ (t+1) 220, first channel $C_1$ (t+1) 222, and second channel $C_2$ (t+1) 224, etc. are processed, the sub-tasks of the tasks assigned to the respect channels executed here usually being different in each case as compared with processing cycle 202.

For the further pipeline stages 1, 2, and 3, a processing operation of the respective channels begins in each case with an offset of one timing cycle.

Provision is made here, for the first pipeline stage (stage 1), that during processing cycle 202 with the value "t" for the counter, the zero-th channel $C_0$ (t) 204, first channel $C_1$ (t) 206, second channel $C_2$ (t) 208, etc. are executed. At the end of the processing cycle, a T–2-th channel $C_{T-2}$ (t) 216 and T–1-th channel $C_{T-1}$ (t) 218 are processed. In the next processing cycle with the value "t+1" for the counter, in sequence, firstly a time slot 250 of CPU 60 is made available and the zero-th channel $C_0$ (t) 220, first channel $C_1$ (t) 222, etc. are executed.

For the second pipeline stage (stage 2), what likewise occurs during the first processing cycle 202 (offset by one timing cycle) is first an execution of the zero-th channel $C_0$ (t) 204 and of first channel $C_1$ (t) 206. These are later followed by a T–3-th channel $C_{T-3}$ (t) 214 and the T–2-th channel $C_{T-2}$ (t) 216. In the next processing cycle with the value "t+1" for the counter, to begin with firstly the T–1-th channel $C_{T-1}$ (t) 218 is executed, then a time slot 250 for the CPU is made available, and then the zero-th channel $C_0$ (t+1) 220, etc. is executed.

For the third pipeline stage (stage 3) during the first processing cycle 202 the zero-th channel $C_0$ (t) 204 is processed. At the end of the first processing cycle 202 with a value "t", execution of a T–4-th channel $C_{T-4}$ (t) 212 and of T–3-th channel $C_{T-3}$ (t) 214 occurs. In the next processing cycle with a value "t+1" for the counter, firstly execution of the T–2-th channel $C_{T-2}$ (t) 216 and of the T–1-th channel $C_{T-1}$ (t) 218 occurs.

A special register TRG 75 depicted in FIG. 1 creates the possibility of mutual triggering of channels. The channels themselves can, by comparison with time- or position-related signals (TBU) 85, shift an event into a current time reference or control it as a function of positions. A comparison of this kind, in which TBU 85 can create an operand, is likewise carried out in ALU 10. Access to data of ARU interface 30 is expected by a corresponding channel, and blocking reading prevents the occurrence of any data inconsistency.

Instruction predecoder 50, depicted in FIG. 1, allows a datum to be made available from RAM 20 in the next processing cycle. For this, a RAM datum is converted into an instruction that writes the datum into the requested target register. Instruction predecoder 50 also ensures that when blocking instructions are activated, the subsequent instructions from the preceding pipeline stages are discarded.

The example circuit configuration according to the present invention has a substantial effect on the latency time of an instruction execution operation.

What is claimed is:

1. A circuit configuration for a data processing system for executing multiple tasks by way of a central processing unit having a processing capacity assigned to the processing unit, the circuit configuration configured to distribute the processing capacity of the processing unit among respective tasks uniformly and independently of a demand of the respective tasks, and to process the respective tasks, in time units resulting therefrom, time-offset fashion until they are respectively executed, the circuit configuration further being configured to allocate to each of the tasks a respective channel having its own registers, and to select the respective registers and connect them to the processing unit in accordance with an assignment of the respective task to the processing unit, and the circuit configuration further being configured to assign the processing unit respectively to each of the tasks for a constant time unit that is identical for all tasks.

2. The circuit configuration as recited in claim 1, wherein the circuit configuration is configured to assign the processing unit to at least one of the tasks periodically with a period corresponding to a length of one processing cycle of the processing unit, if the at least one task requires more than one time unit to be processed.

3. The circuit configuration as recited in claim 1, wherein the circuit configuration is further configured to perform an execution of instructions of the respective registers of the respective channels of the tasks in a pipeline having multiple stages, the respective registers being switched over, at the time of execution, into correspondingly clocked pipeline registers of the pipeline, and the pipeline registers being processed in a time segment in parallel but for different channels in each case.

4. The circuit configuration as recited in claim 3, wherein instruction decoding and memory accesses for a first task occurring respectively in time segments in which the processing unit is assigned at least to a second task.

5. A method for executing multiple tasks in a data processing system using a central processing unit having a processing capacity assigned to the processing unit, the method comprising:

distributing the processing capacity of the processing unit among respective tasks, uniformly and independently of a demand of the respective tasks, until they are respectively executed, and the respective tasks being processed, in the individual time units resulting therefrom, in time-offset fashion, a respective channel having its own registers being allocated to each of the tasks, and the respective registers being selected and connected to the processing unit in accordance with the assignment of the respective task to the central processing unit; and assigning the processing unit to each of the tasks respectively for a constant time unit that is identical for all tasks.

6. The method as recited in claim 5, further comprising:

performing an execution of instructions of the respective registers of the channels allocated to the respective tasks in a pipeline having multiple pipeline stages, the respective registers being switched over, at the time of execution, into correspondingly clocked pipeline registers of the pipeline, and the pipeline stages being processed in a time segment in parallel but for different channels in each case.

* * * * *